United States Patent [19]

Asatourian

[11] 4,272,800
[45] Jun. 9, 1981

[54] SAFE-SPEED INDICATOR SYSTEM

[76] Inventor: Rolin K. Asatourian, 20231 Brightwood Ct., Yorba Linda, Calif. 92686

[21] Appl. No.: 938,816

[22] Filed: Sep. 1, 1978

[51] Int. Cl.³ .......................... F21V 13/00; B60Q 1/00
[52] U.S. Cl. ..................................... 362/242; 362/232; 362/71; 362/280; 340/66; 340/71; 340/104
[58] Field of Search ................. 362/71, 232, 242, 276, 362/280, 281; 340/69, 104, 128, 66, 71; 356/3

[56] References Cited

U.S. PATENT DOCUMENTS

| 153,591 | 7/1874 | McMullin | 340/104 |
| 2,474,610 | 6/1949 | Wunsch | 340/71 |
| 2,531,337 | 11/1950 | Knapp | 340/25 |
| 2,559,415 | 7/1951 | Field et al. | 340/103 |
| 3,642,372 | 2/1972 | Rittenhouse | 340/104 |
| 3,748,643 | 7/1973 | Jacobs | 340/66 |

Primary Examiner—Monroe H. Hayes

[57] ABSTRACT

A safe-speed indicator system including a projector device, projecting beams of different colors, such that each pair of beams intersect each other at different predetermined distances which expand during any slowdown of the vehicle upon which the said projector device is mounted, to give the driver following it a measure of how fast a speed change he should anticipate to avoid collision. A color-pattern attached to the speedometer is used by the following driver to find out from the observable color(s) of the projector of the preceding vehicle what his safe speed is.

6 Claims, 5 Drawing Figures

SAFE-SPEED INDICATOR SYSTEM

BACKGROUND OF THE INVENTION

The increased congestion of highways combined with high driving speeds, creates a situation which requires a driver to judge the separation of his vehicle and the vehicle he is following, and to correlate this distance with a speed which is safe enough to bring his vehicle to a stop if need arises. Correlating the distance to a safe speed may not be straightforward, especially at relatively higher speeds where the separation between vehicles should be more than one car's length per each 10 miles an hour of speed generally recommended at lower speeds.

The present invention includes a projector device, the observable color (or colors) of which varies at different distances of the observer and represents his distance from it, and a memory aid pattern means to correlate these distances with the required safe speeds.

Beside keeping a safe distance from the preceeding vehicle, a driver on a high-speed highway deals with the problem of judging how fast his front vehicle is stopping when it does so. More technically, what the deceleration, i.e., negative acceleration, of his front vehicle is. Unfortunately, the brakelights, although indicating the application of brakes, do not show the amount of deceleration produced. Consequently, the judgement of the amount of deceleration of the front vehicle by a driver following it is based upon observation of how fast he approaches his front vehicle. This kind of judgement requires some time, causing delay in deciding what amount of braking is needed to avoid collision with the front decelerating vehicle. The delay time such introduced may be longer for a driver following a vehicle whose driver uses his brakes more often and for minor speed adjustments, since naturally, one would be inclined to ignore the brakelights. In sudden stops, the delay in determining that heavy braking is needed to avoid collision, may necessitate even heavier braking, increasing the chance of being bumped into by a vehicle which may be following closely from behind. Furthermore, a vehicle may be decelerated to some extent even without use of brakes and by merely reducing the amount of accelerator used and with no warning to the following driver.

The presently disclosed system helps the driver to determine his safe speed, and to make safer speed adjustment in accordance with the amount of deceleration of his front vehicle.

SUMMARY OF THE INVENTION

The disclosed invention comprises of a projector means which projects a set of parallel beams of different colors. Preferably, the sequence of the colors projected is symmetric with respect to a vertical plane bisecting at right angle the projecting side of the projector; in which case beams of same color intersect each other on this plane. An observer located on this plane would see two beams of the same color, each coming from the left or right half of the projector. As the observer moves on this plane towards the projector, he would see that the color of the intersecting beams changes with his separation from the projector. A preferred sequence of colors such observed can be green, yellow, orange and red. If the observer deviates from this central plane to a certain extent the two intersecting beams observable to him would not be of the same color. The observer would carry a color-coded chart or pattern to help him interpret the color(s) of the observable beams to him in terms of his distance from the projector. If disclosed system is being used as an aid to safe driving, this color-coded pattern may directly indicate the maximum safe speed of a vehicle following another vehicle, the latter utilizing the projector. The system may have applications other than an aid to safe driving. It may be used in any case where the distance of an observer has to be determined, with a certain degree of accuracy, from an object which the projector is attached to; also in cases where the observer has to be signaled about the acceleration or deceleration of this object.

By attaching a proper weight to an arm in the projector, the projector can be made responsive to a change in the speed of its motion such that an accelerated or decelerated motion would cause a change in the colors of the projected beams. When utilizing the projector as an aid for safe driving, this change in decelerated motion should be in a manner that colors corresponding to lower safe speeds should be observable at further relative distances from the projector where colors allowing higher speeds are observable in a fixed-speed motion of the projector. Consequently, a following driver will be warned that his maximum safe speed is changed and that he should adjust his speed accordingly.

DESCRIPTIONS OF THE DRAWINGS

DESCRIPTION OF THE PREFERRED EMBODIMENTS

Figure 1:
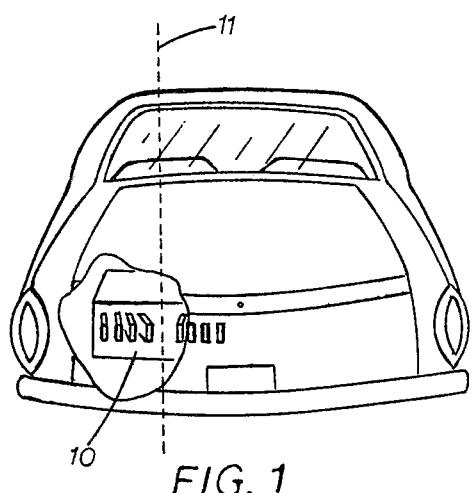
FIG. 1 is the view of the rear of a vehicle utilizing a preferred embodiment of the projector of the disclosed invention.

Referring to FIG. 1, a preferred embodiment of the disclosed projector 10 is attached to the rear of a vehicle. Although it will still be usable when attached at other positions on the rear of the vehicle, such as over the center of the bumper if proper color-coded pattern is used for interpreting the observable colors, the interpretation of distance or maximum safe speed would be simpler if it is positioned such that the vertical central plane of it 11, passes through the center of the driver's seat.

Figure 2:
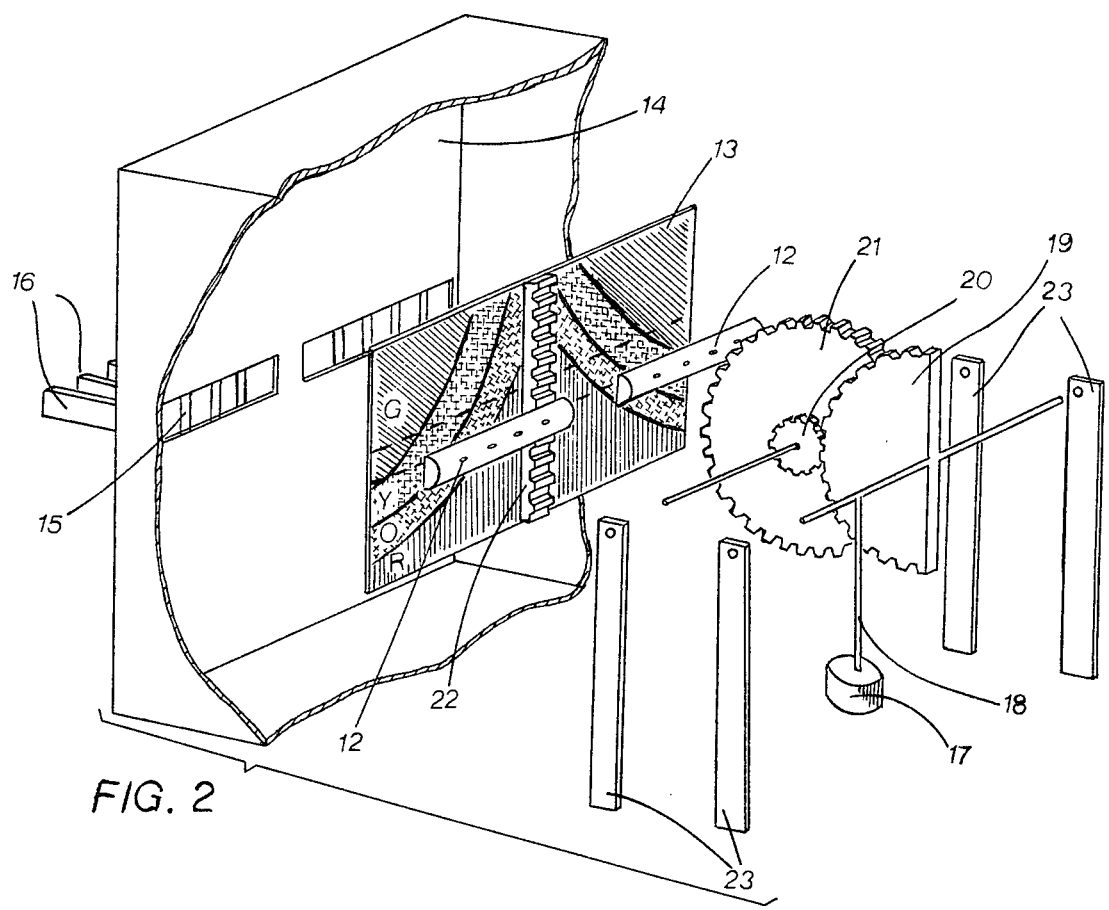
FIG. 2 shows the main parts of the preferred embodiment of the subject projector, separated for better illustration.
Figure 3:
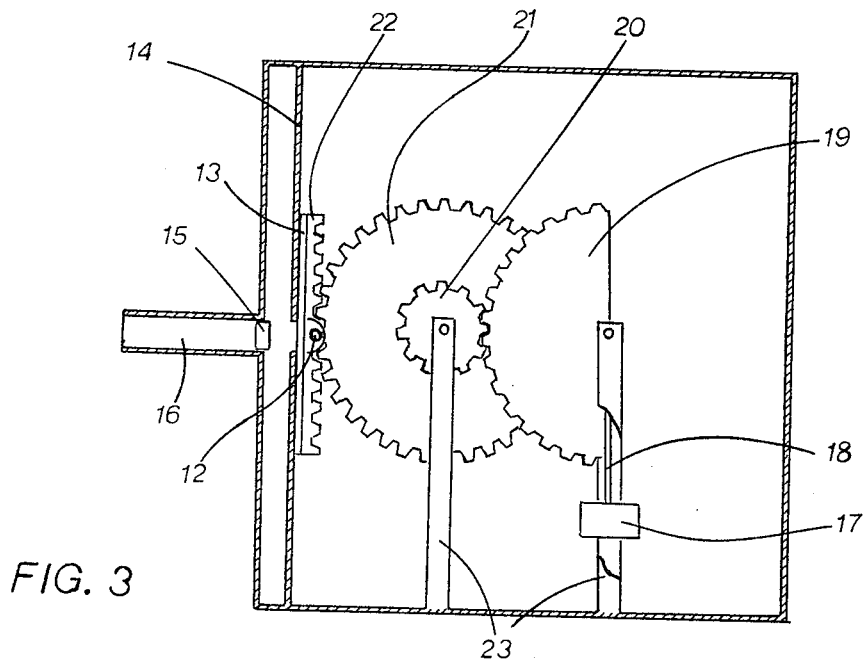
FIG. 3 is a crossectional side view of the preferred embodiment of the subject projector intended to give a better illustration of the spur gear assembly.

Referring now to FIGS. 2 and 3, a set of white light sources 12 illuminate a transparency 13 which has a certain pattern of colors in sequence of red, orange, yellow, and green when going from low and central part to the top and sides of the transparency and symmetric on left and right halves of it. As will be discussed in a later description, at a fixed speed (including zero speed, or stopped situation) the transparency is held in a position in which the windows of the color selector 14 uncovers the set of colors between the indicated dashed lines on transparency 13. Each of the four cylindrical convergent lenses 15 at each side of central plane 11, which are at a focal distance from the transparency, project a parallel beam of the color of the transparency which is in front of it, namely one of green, yellow, orange, or red. Since the color pattern of the transparency is chosen to be symmetric on its left and right halves, beams of the same color would intersect each other on the central plane 11. The distance of intersection point of two projected beams coming from the left and right lenses from the projector, hereafter referred to as intersection distance, decreases going from green to red. The baffles 16 in front of each lens limits, in a more accurate manner, the region in which the beam projected from the lens is to be seen. A mass 17 is attached to an arm 18, which is connected to a spur gear assembly consisting of gears 19, 20, 21, and 22. The spur gear assembly is supported by a set of stands 23. In the fixed-speed motion of the projector the weight of the transparency 13 and gear 22 attached to it is supported through the spur gear assembly by the torque produced by the weight of the mass 17 such that the section of the transparency between the dashed lines is positioned in front of the color selector windows. During a slow-down, or decelerated motion of the projector, the mass swings forward and stays there, lifting up the transparency and changing the colors now uncovered through the windows in the color selector. The change in the uncovered colors of the transparency through the windows during a decelerated motion is in direction of shifting central colors towards the side lenses to be projected with larger intersection distances. When the projector is mounted on a vehicle, this shift would warn the following driver to adjust his speed to a new safe speed corresponding to the new color or colors observable to him. The higher the deceleration, the more the swing angle of the mass and the more the color shift. It may also be desirable to inform a following driver that his front vehicle is speeding up and his safe speed would be increasing for the separation he has from his front vehicle. In this case, a backward motion of the mass 17, during an accelerated motion would shift down the transparency from its balanced position in fixed-speed motion, shortening the intersection distance of the colors. If it is not desired to have a projector which is responsive to change in its speed, then no weight is attached to arm 18 and transparency 13 is secured at its position for fixed-speed motion, in which case the section between the dashed lines is uncovered through the window of the color selector.

Figure 4:
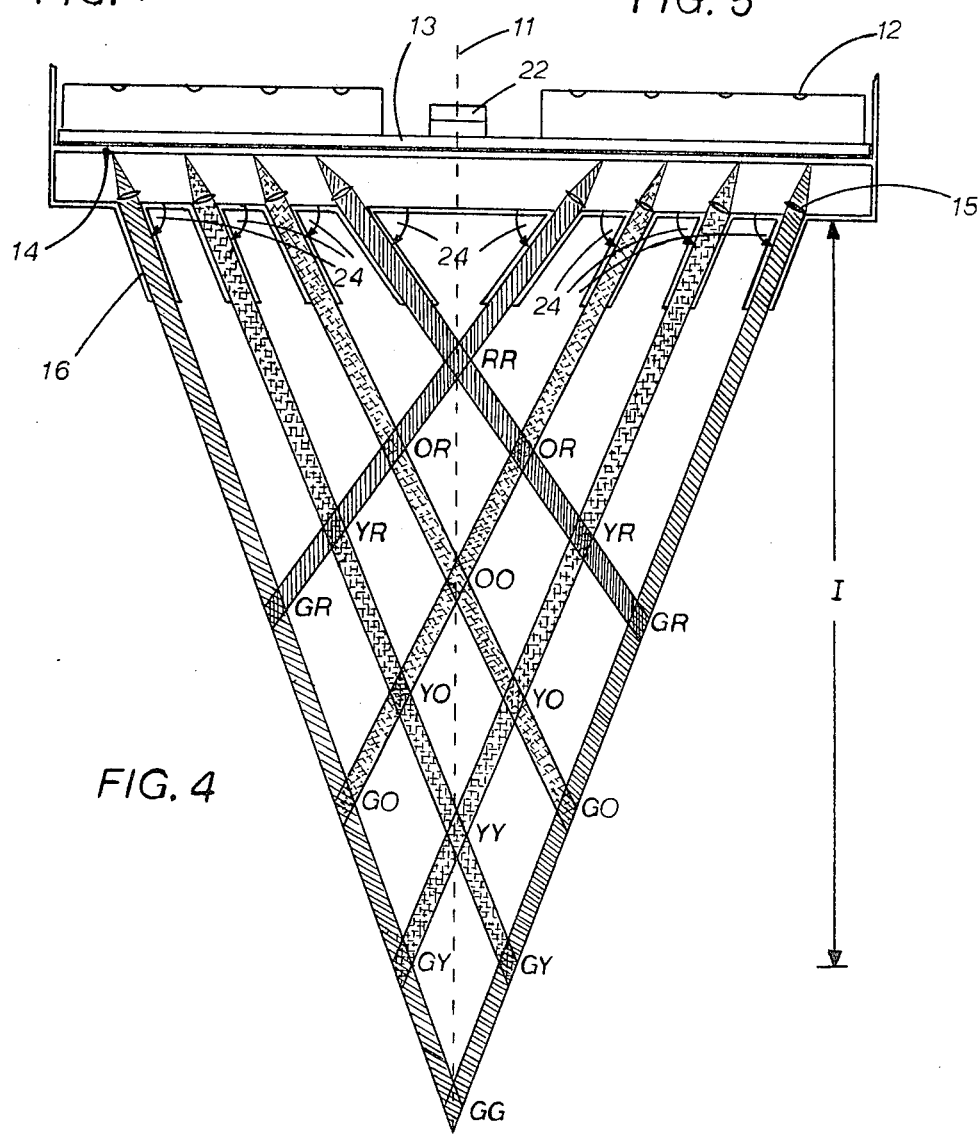
FIG. 4 is a top view of the optical elements in the preferred embodiment of the subject projector, illustrating the intersection points of the projected beams.

Referring to FIG. 4, letters G, Y, O, and R represent the colors of the projected beams: green, yellow, orange, and red respectively; and the double letters represent the color(s) of the two beams intersecting at the adjacent point to the letters. For example, GY means the intersecting beams at that point are of green and yellow colors. The projection angles 24 are made small to be able to show the intersection points in the figure.

Figure 5:
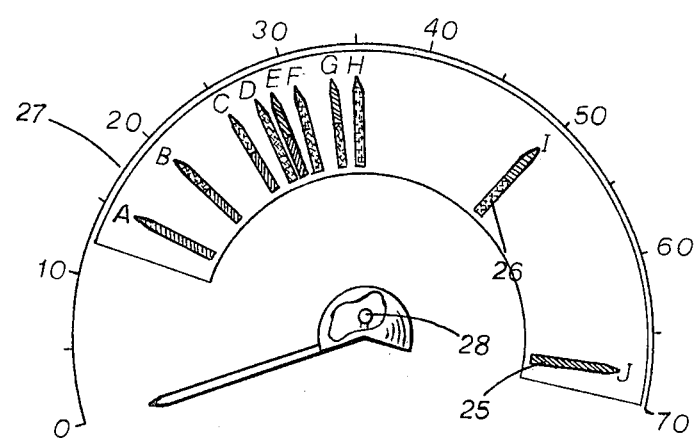
FIG. 5 shows a preferred embodiment of the color-coded pattern.

Referring now to FIG. 5, the color stripes point to the numbers A–J which represent the intersection distances of beams of corresponding color(s) in FIG. 4. For instance, an observer at one of the points marked GY in FIG. 4 is at the intersection point of green and yellow beams, those being the only observable colors to him, and the stripe with corresponding colors would indicate his distance from the projector to be (I) feet.

If the color-coded pattern of FIG. 5 is made to interpret the maximum safe driving speed, then letters A–J would indicate the maximum safe speeds for a driver who observes the corresponding color(s). The positions of the stripes can be arranged such that each stripe would point to its maximum safe speed on the speedometer dial 27, in which case numbers A–J can be omitted from the color-coded pattern, since they can be read directly from the divisions of the speedometer dial. A light source 28 can be used to illuminate the pattern for more convenient use, especially in night driving.

What is claimed is:

1. A light projector comprising a housing, a plurality of white light sources; a transparency means located in front of the said light sources to selectively pass through different colors of the white light radiating from the said light sources; a color selector means having windows through which only a selected set of colors of the said transparency means can be observed; a plurality of convergent lenses positioned at a focal distance from the said transparency means to produce parallel beams of light of the colors selectively uncovered by the said color selector means, said parallel beams being projected by the said plurality of lenses on left and right hand sides of the said projector at different converging projection angles, such that a beam projected from one such lens on one side intersects with each of the beams projected from other lenses on the other side of the said projector at predetermined distances thereof, the weight of the said transparency means being supported by a weight, through a spur-gear assembly, the said weight being suspended in a manner to allow for its swing when the said housing is decelerated or accelerated, the said swing of the said weight being translated through the said spur-gear assembly to a displacement of the said transparency means, resulting in uncovering of a new set of colors in the said transparency means and projection of each of the said new uncovered colors by one of the said lenses whose projection angle is different from the projection angle of the lens projecting the said color in fixed-speed motion of the said projector.

2. A light projector as in claim 1, wherein the color pattern on the said transparency means is symmetric in respect with the central vertical plane of the said projector, and the projection angles of the said projected beams are likewise symmetric.

3. A light projector as in claim 2 wherein the sequence of the said color pattern on the said transparency means is green, yellow, orange and red, as going towards the said central vertical plane from sides, and intersection distance being less for colors projected from said lenses closer to the said central plane.

4. A light projector as in claim 1 with two or more baffles used in conjunction with each of said lenses for more accurately limiting the region wherein the projected beam from the said lens is to be seen.

5. A color-coded pattern means attached to the speedometer of a vehicle the said pattern comprising of a plurality of single- and double-colored stripes, each of the said stripes pointing to a speed on the dial of the said speedometer, the said speed being the maximum speed which would be considered a safe driving speed when the color or colors of the said stripe pointing to the said speed is or are the observable color or colors to the driver of the said vehicle following another vehicle, the latter vehicle being equipped with a projector as in claim 1, to indicate to the driver of the said following vehicle his maximum safe driving speed when the said front vehicle decelerates, accelerates or moves with a constant speed.

6. A color-coded means as in claim 5, wherein the said pattern is illuminated by a light source for more convenient use, especially in night driving.

* * * * *